(12) United States Patent
Eichenauer et al.

(10) Patent No.: US 7,074,854 B2
(45) Date of Patent: Jul. 11, 2006

(54) ABS MOULDING MATERIAL WITH IMPROVED WORKABILITY AND A HIGH LUSTRE

(75) Inventors: Herbert Eichenauer, Dormagen (DE); Eckhard Wenz, Köln (DE); Heinrich Alberts, Odenthal (DE); Ulrich Jansen, Dormagen (DE); Hans-Erich Gasche, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 60 days.

(21) Appl. No.: 10/204,137

(22) PCT Filed: Feb. 12, 2001

(86) PCT No.: PCT/EP01/01494

§ 371 (c)(1),
(2), (4) Date: Aug. 16, 2002

(87) PCT Pub. No.: WO01/62850

PCT Pub. Date: Aug. 30, 2001

(65) Prior Publication Data

US 2003/0036586 A1    Feb. 20, 2003

(30) Foreign Application Priority Data

Feb. 23, 2000   (DE) ................. 100 08 418

(51) Int. Cl.
*C08L 51/04* (2006.01)
(52) U.S. Cl. .............. 525/66; 525/67; 525/71
(58) Field of Classification Search .......... 525/71, 525/66, 67
See application file for complete search history.

(56) References Cited

U.S. PATENT DOCUMENTS

| | | |
|---|---|---|
| 4,009,226 A | 2/1977 | Ott et al. |
| 4,009,227 A | 2/1977 | Ott et al. |
| 4,713,420 A | 12/1987 | Henton ................. 525/236 |
| 4,874,815 A | 10/1989 | Bubeck et al. ........... 525/71 |
| 5,008,331 A | 4/1991 | Kawashima et al. ....... 525/84 |
| 5,200,441 A | 4/1993 | Kim et al. ............. 523/221 |
| 5,352,728 A | 10/1994 | Kim et al. ............. 524/501 |
| 5,741,853 A | 4/1998 | Eichenauer et al. ........ 525/71 |
| 5,883,189 A * | 3/1999 | Eichenauer et al. ........ 525/71 |

FOREIGN PATENT DOCUMENTS

| | | |
|---|---|---|
| DE | 41 13 326 | 10/1992 |
| DE | 19853107 | * 5/2000 |
| DE | 19858731 | * 6/2000 |
| EP | 0 845 496 | 6/1998 |
| WO | 89/05836 | 6/1989 |

* cited by examiner

Primary Examiner—Jeffrey Mullis
(74) Attorney, Agent, or Firm—Jill Denesvich

(57) ABSTRACT

A Polymer compositions that features high degree of toughness, very good processability and extremely high gloss is disclosed. The composition contains
(I) a graft rubber polymer obtained by emulsion polymerization of styrene and acrylonitrile in the presence of a mixture of
(A) a butadiene polymer latex having a mean particle diameter $d_{50} \leq 250$ nm, a particle size distribution width of 20 to 80 nm and a gel content of 30 to 95 wt. %,
(B) a butadiene polymer latex with a mean particle diameter $d_{50} > 250$ to 350 nm, a particle size distribution width of 30 to 100 nm and gel content of 30 to 80 wt. %, and
(C) a butadiene polymer latex (C) with a mean particle diameter $d_{50} > 350$ nm, a particle size distribution width of 40 to 150 nm, and a gel content of 50 to 95 wt. %. and
(II) a rubber-free copolymer of styrene and acrylonitrile. At least one of (A), (B) and (C) is a product of seed polymerization.

12 Claims, No Drawings

ABS MOULDING MATERIAL WITH IMPROVED WORKABILITY AND A HIGH LUSTRE

ABS moulding compositions have already been used for many years in large amounts as thermoplastic resins for producing all types of moulded parts. In this connection the properties of these resins may be varied within wide ranges.

In order to produce large-area parts, in particular housing parts, ABS polymers are required that are characterised by a very good processing performance, in particular by a very high thermoplastic flowability, and that can be used to produce moulded parts having a very high surface gloss. In this connection the other properties (e.g. toughness, modulus of elasticity) must not be negatively influenced.

Attempts have been made using emulsion polymerisation technology to produce products having the required properties by combined use of various graft rubber components in a thermoplastic resin matrix.

Thus, DE-A 24 20 357 and DE-A 24 20 358 for example describe thermoplastic moulding compositions of the ABS type having high toughness, high surface gloss and easier processability by combining a coarsely particulate graft rubber with a finely particulate graft rubber, wherein the weight ratios of styrene to acrylonitrile in the graft rubbers and in the matrix resin must have special values.

A disadvantage of such moulding compositions of the ABS type is that two separately produced graft rubber polymers are required. Also, the flow properties do not meet the requirements of modem processing technology.

EP-A 470 229, EP-A 473 400 and WO 91/13118 disclose that impact-resistant, high-gloss thermoplastic resins can be produced by combining a graft polymer having a low rubber content and small particle diameter with a graft polymer having a high rubber content and relatively large particle diameter.

The disadvantage of these products is the not always sufficient thermoplastic flowability as well as the necessity for two separate graft polymerisation stages.

DE-A 41 13 326 describes thermoplastic moulding compositions with two different graft products, wherein the rubber content of the graft rubbers are in each case at most 30 wt. %. Accordingly it is necessary to use relatively high amounts of graft rubbers, which means that the thermoplastic flowability can be varied only within narrow ranges. Furthermore, the gloss values that can be achieved are unsatisfactory and here too two separate graft polymerisation reactions are necessary.

Attempts have also been made by using mixtures of two rubber latices as grafting bases to synthesise graft rubbers for the production of improved ABS products.

Thus for example EP-A 288 298 describes the production of products with a finely particulate and a more coarsely particulate rubber latex as grafting bases, though only grafting rubbers with low rubber contents of around 40% are described. The thermoplastic resins produced therefrom have an unsatisfactory processability however on account of the poor thermoplastic flowability; furthermore resin components with high acrylonitrile contents must be used, which normally leads to discoloration of the ABS products.

EP-A 745 624 describes the use of two rubber latices with defined particle size distribution widths for producing ABS moulding compositions without any deepening of the colour shade in moulded parts with rib structures. These products however are characterised by a poor relationship between toughness and thermoplastic processability (flowability).

The object therefore existed of providing thermoplastic moulding compositions of the ABS type that do not exhibit the aforementioned disadvantages, that have a very good thermoplastic processability, and that can be used to make moulded parts having a very high surface gloss. In this connection the ABS moulding compositions should preferably contain a graft rubber product produced in a single process step, wherein the said graft rubber polymer should have rubber contents of greater than 50 wt. %, preferably above 55 wt. %.

The present invention accordingly provides polymer compositions containing

I) a graft rubber polymer that can be obtained by emulsion polymerisation of styrene and acrylonitrile in a weight ratio of 95:5 to 50:50, wherein styrene and/or acrylonitrile can be wholly or partially replaced by α-methylstyrene, methyl methacrylate or N-phenylmaleimide or mixtures thereof, in the presence of a mixture of a butadiene polymer latex (A) with a mean particle diameter $d_{50} \leq 250$ nm, preferably 100 to 240 nm, particularly preferably 130 to 230 nm and most particularly preferably 150 to 220 nm and a particle size distribution width (measured as $d_{90}$–$d_{10}$ from the integral particle size distribution) of 20 to 80 nm, preferably 30 to 60 nm, and a gel content of 30 to 95 wt. %, preferably 40 to 90 wt. % and particularly preferably 50 to 85 wt. %, preferably obtained by seed polymerisation using a seed latex with a mean particle diameter $d_{50}$ of 10 to 100 nm, preferably 20 to 90 nm and particularly preferably 30 to 80 nm, a butadiene polymer latex (B) with a mean particle diameter $d_{50}>250$ nm to 350 nm, preferably 260 to 340 nm and particularly preferably 270 to 320 nm, a particle size distribution width (measured as $d_{90}$–$d_{10}$ from the integral particle size distribution) of 30 to 100 nm, preferably 40 to 80 nm, and a gel content of 30 to 80 wt. %, preferably 40 to 75 wt. % and particularly preferably 45 to 70 wt. %, preferably obtained by seed polymerisation using a seed latex with a mean particle diameter $d_{50}$ of 30 to 150 nm, preferably 35 to 140 nm and particularly preferably 40 to 130 nm, most particularly preferably using the same seed latex as in the production of the polybutadiene polymer latex (A), and a butadiene polymer latex (C) with a mean particle diameter $d_{50}>350$ nm, preferably 360 to 450 nm, particularly preferably 370 to 440 nm and most particularly preferably 375 to 430 nm, a particle size distribution width (measured as $d_{90}$–$d_{10}$ from the integral particle size distribution) of 40 to 150 nm, preferably 50 to 100 nm, and a gel content of 50 to 95 wt. %, preferably 55 to 90 wt. % and particularly preferably 60 to 85 wt. %, preferably obtained by seed polymerisation using a seed latex with a mean particle diameter $d_{50}$ of 100 to 250 nm, preferably 120 to 240 nm and particularly preferably 150 to 220 nm, most particularly preferably using the butadiene polymer latex (A) as seed latex, wherein the butadiene polymer latices in each case contain 0 to 50 wt. % of a further vinyl monomer incorporated by copolymerisation and wherein the weight ratio of the graft monomers that are used to the butadiene polymers that are used is 5:95 to 70:30, preferably 10:90 to 60:40, and particularly preferably 20:80 to 50:50, and II) at least one rubber-free copolymer of styrene and acrylonitrile in a weight ratio of 95:5 to 50:50, wherein styrene and/or acrylonitrile can be wholly or partially replaced by α-methylstyrene, methyl methacrylate or N-phenylmaleimide or mixtures thereof, wherein at least one latex selected from the butadiene polymer latices (A), (B) and (C), preferably two latices selected from the butadiene polymer latices (A), (B) and (C), and particularly preferably all three butadiene polymer latices (A), (B) and (C) is/are produced by seed polymerisation.

The butadiene polymer latices (A), (B) and (C) may in principle be employed in arbitrary amounts in the production of the graft rubber polymer (I).

The butadiene polymer latices (A), (B) and (C) are preferably used in the production of the graft rubber polymer (I) in amounts of 5 to 70 wt. %, preferably 10 to 60 wt. % and particularly preferably 15 to 50 wt. % of (A), 10 to 70 wt. %, preferably 15 to 60 wt. % and particularly preferably 20 to 55 wt. % of (B), and 5 to 60 wt. %, preferably 7.5 to 50 wt. % and particularly preferably 10 to 45 wt. % of (C) (in each case referred to the respective solids content of the latices).

In general the moulding compositions according to the invention may contain 1 to 60 parts by weight, preferably 5 to 50 parts by weight of (I), and 40 to 99 parts by weight, preferably 50 to 95 parts by weight of (II).

The invention furthermore provides a process for producing a polymer composition, wherein a graft rubber polymer that can be obtained by emulsion polymerisation of styrene and acrylonitrile in a weight ratio of 95:5 to 50:50, wherein styrene and/or acrylonitrile may be wholly or partially replaced by α-methylstyrene, methyl methacrylate or N-phenyl-maleimide or mixtures thereof, is produced in the presence of a mixture of a butadiene polymer latex (A) with a mean particle diameter $d_{50} \leq 250$ nm and a particle size distribution width (measured as $d_{90}-d_{10}$ from the integral particle size distribution) of 20 to 80 nm, and a gel content of 30 to 95 wt. %, a butadiene polymer latex (B) with a mean particle diameter $d_{50} > 250$ to 350 nm, a particle size distribution width (measured as $d_{90}-d_{10}$ from the integral particle size distribution) of 30 to 100 nm, and a gel content of 30 to 80 wt. %, and a butadiene polymer latex (C) with a mean particle diameter $d_{50} > 350$ nm, a particle size distribution width (measured as $d_{90}-d_{10}$ from the integral particle size distribution) of 40 to 150 nm, and a gel content of 50 to 95 wt. %, using at least one latex produced by seed polymerisation and selected from the butadiene polymer latices (A), (B) and (C), wherein the butadiene polymer latices in each case contain 0 to 50 wt. % of a further vinyl monomer incorporated by copolymerisation and wherein the weight ratio of graft monomers that are used to butadiene polymers that are used is 5:95 to 70:30, and the graft polymer is mixed with at least one rubber-free copolymer of styrene and acrylonitrile in a weight ratio of 95:5 to 50:50, wherein styrene and/or acrylonitrile may be partially or wholly replaced by α-methylstyrene, methyl methacrylate or N-phenylmaleimide or mixtures thereof.

Furthermore the moulding compositions according to the invention may contain further rubber-free thermoplastic resins that are not built up from vinyl monomers, wherein these thermoplastic resins are used in amounts of up to 1000 parts by weight, preferably up to 700 parts by weight and particularly preferably up to 500 parts by weight (in each case referred to 100 parts by weight of I+II).

The butadiene polymer latices (A), (B) and (C) may be produced by emulsion polymerisation of butadiene in a manner known per se (see for example Houben-Weyl, Methoden der Organischen Chemie, Makromolekulare Stoff, Part 1, p. 674 (1961), Thieme Verlag Stuttgart). As comonomers there may be used up to 50 wt. % (referred to the total amount of monomers used in the production of the butadiene polymer) of one or more monomers copolymerisable with butadiene.

Examples of such monomers include isoprene, chloroprene, acrylonitrile, styrene, α-methylstyrene, $C_1$–$C_4$-alkylstyrenes, $C_1$–$C_8$-alkyl acrylates, $C_1$–$C_8$-alkyl methacrylates, alkylene glycol diacrylates, alkylene glycol dimethacrylates, divinyl benzene; butadiene is preferably used alone or mixed with up to 20 wt. %, preferably with up to 10 wt. %, of styrene and/or acrylonitrile.

The polymerisation is preferably carried out according to the so-called seed polymerisation technique, in which first of all a finely divided polymer, preferably a butadiene polymer, is produced as seed latex and is then further polymerised to form larger particles by further reaction with butadiene-containing monomers.

As seed latex polymers there are preferably used butadiene polymers such as e.g. polybutadiene, butadiene/styrene copolymers, butadiene/acrylonitrile copolymers, or polymers formed from the aforementioned monomers.

In principle other finely particulate latex polymers may also be used, for example polystyrene or styrene copolymers, poly(methyl methacrylate) or methyl methacrylate copolymers, as well as polymers of other vinyl monomers.

Preferred seed latex polymers are butadiene latices.

In this connection a seed latex with a mean particle diameter $d_{50}$ of 10 to 100 nm, preferably 20 to 90 nm and particularly preferably 30 to 80 nm is used in the production of the butadiene polymer latex (A).

In the production of the butadiene polymer latex (B) a seed latex is used with a mean particle diameter $d_{50}$ of 30 to 150 nm, preferably 35 to 140 nm and particularly preferably 40 to 130 nm, and it is most particularly preferred to use the same seed latex as is used in the production of the butadiene polymer latex (A).

In the production of the butadiene polymer latex (C) a seed latex is used with a mean particle diameter $d_{50}$ of 100 to 250 nm, preferably 120 to 240 nm and particularly preferably 150 to 220 nm, and it is most particularly preferred to use the butadiene polymer latex (A) as seed latex.

The seed latex polymers have a gel content of 10 to 95 wt. %, preferably 20 to 90 wt. % and particularly preferably 30 to 85 wt. %.

The butadiene polymer latex (A) has a mean particle diameter $d_{50} \leq 250$ nm, preferably 100 to 240 nm, particularly preferably 130 to 230 nm, and most particularly preferably 150 to 220 nm, a particle size distribution width (measured as $d_{50}-d_{10}$ from the integral particle size distribution) of 20 to 80 nm, preferably 30 to 60 nm, and a gel content of 30 to 95 wt. %, preferably 40 to 90 wt. %, and particularly preferably 50 to 85 wt. %

The butadiene polymer latex (B) has a mean particle diameter $d_{50}$ of >250 nm to 350 nm, preferably 260 to 340 nm and particularly preferably 270 to 320 nm, a particle size distribution width (measured as $d_{50}-d_{10}$ from the integral particle size distribution) of 30 to 100 nm, preferably 40 to 80 nm, and a gel content of 30 to 80 wt. %, preferably 40 to 75 wt. %, and particularly preferably 45 to 70 wt. %.

The butadiene polymer latex (C) has a mean particle diameter $d_{50}$ of >350 nm, preferably 360 to 450 nm, particularly preferably 370 to 440 nm, and most particularly preferably 375 to 430 nm, a particle size distribution width (measured as $d_{50}-d_{10}$ from the integral particle size distribution) of 40 to 150 nm, preferably 50 to 100 nm, and a gel content of 50 to 95 wt. %, preferably 55 to 90 wt. %, and particularly preferably 60 to 85 wt. %.

The mean particle diameter $d_{50}$, as well as the $d_{10}$ values and $d_{90}$ values, can be determined by ultracentrifugation measurements (see W. Scholtan, H. Lange: Kolloid Z. u. Z. Polymere 250, pp. 782 to 796 (1972)), the specified values for the gel content referring to the determination by the wire cage method in toluene (see Houben-Weyl, Methoden der Organischen Chemie, Makromolkulare Stoffe, Part I, p. 307 (1961), Thieme Verlag Stuttgart).

The gel contents of the butadiene polymer latices (A), (B) and (C) as well as of the seed polymer latices may in principle be adjusted in a manner known per se by employing suitable reaction conditions (e.g. high reaction temperature and/or polymerisation up to a high degree of conversion as well as optionally the addition of crosslinking substances in order to achieve a high gel content, or for example a low reaction temperature and/or termination of the polymerisation reaction before too high a degree of crosslinking has occurred, as well as optionally the addition of molecular weight regulators such as n-dodecyl mercaptan or t-dodecyl mercaptan in order to achieve a low gel content). As emulsifiers there may be used conventional anionic emulsifiers such as alkyl sulfates, alkyl sulfonates, aralkyl sulfonates, soaps of saturated or unsaturated fatty acids, as well as alkaline disproportionated or hydrogenated abietinic acid or tall oil acid, and preferably emulsifiers having carboxyl groups are used (e.g. salts of $C_{10}$–$C_{18}$ fatty acids, disproportionated abietinic acid, emulsifiers according to DE-OS 36 39 904 and DE-OS 39 13 509).

In order to achieve the effect according to the invention at least one latex selected from the butadiene polymer latex components (A), (B) and (C), preferably two latices selected from the butadiene polymer latex components (A), (B) and (C), and particularly all three butadiene polymer latex components (A), (B) and (C) must have been produced by seed polymerisation.

The graft polymerisation in the production of the graft polymer I) may be carried out according to any suitable methods, but is preferably carried out in such a way that the monomer mixture is continuously added to the mixture of the butadiene polymer latices (A), (B) and (C), and is polymerised.

Special monomer/rubber ratios are preferably maintained during the polymerisation, and the monomers are added to the rubber in a manner known per se.

In order to produce the component I) according to the invention, preferably 15 to 50 parts by weight, particularly preferably 20 to 40 parts by weight, of a mixture of styrene and acrylonitrile that may optionally contain up to 50 wt. % (referred to the total amount of the monomers employed in the graft polymerisation) of one or more comonomers, are polymerised in the presence of preferably 50 to 85 parts by weight, particularly preferably 60 to 80 parts by weight (in each case referred to solids) of the butadiene polymer latex mixture of (A), (B) and (C).

The monomers used in the graft polymerisation are preferably mixtures of styrene and acrylonitrile in a weight ratio of 95:5 to 50:50, particularly preferably in a weight ratio of 80:20 to 65:35, wherein styrene and/or acrylonitrile may be wholly or partially replaced by copolymerisable monomers, preferably by α-methylstyrene, methyl methacrylate or N-phenylmaleimide. In principle arbitrary further copolymerisable vinyl monomers may additionally be used in amounts of up to ca. 10 wt. % (referred to the total amount of the monomers).

In addition molecular weight regulators may be used in the graft polymerisation, preferably in amounts of 0.01 to 2 wt. %, particularly preferably in amounts of 0.05 to 1 wt. % (in each case referred to the total amount of monomers in the graft polymerisation stage).

Suitable molecular weight regulators are for example alkyl mercaptans such as n-dodecyl mercaptan, t-dodecyl mercaptan; dimeric α-methylstyrene; terpinolene.

Suitable initiators that may be used include inorganic and organic peroxide, e.g. $H_2O_2$, di-tert.-butyl peroxide, cumene hydroperoxide, dicyclohexyl percarbonate, tert.-butyl hydroperoxide, p-menthane hydroperoxide, azo initiators such as azobisisobutyronitrile, persalts such as ammonium, sodium or potassium persulfate, potassium perphosphate, sodium perborate, as well as redox systems. Redox systems consist as a rule of an organic oxidising agent and a reducing agent, in which connection heavy metal ions may in addition be present in the reaction medium (see Houben-Weyl, Methoden der Organischen Chemie, Vol. 14/1, pp. 263 to 297).

The polymerisation temperature is in general 25° C. to 160° C., preferably 40° C. to 90° C. Suitable emulsifiers are mentioned above.

The polymerisation may be carried out under normal temperature conditions, i.e. isothermally; the graft polymerisation is however preferably carried out so that the temperature difference between the start and end of the reaction is at least 10° C., preferably at least 15° C., and particularly preferably at least 20° C.

In order to produce the component I) according to the invention, the graft polymerisation may preferably be carried out by addition of the monomers in such a way that 55 to 90 wt. %, preferably 60 to 80 wt. % and particularly preferably 65 to 75 wt. % of the total amount of monomers used in the graft polymerisation are metered in during the first half of the overall time for metering in the monomers; the remaining proportion of the monomers is metered in within the second half of the overall time for metering in the monomers.

As rubber-free copolymers II) there are preferably used copolymers of styrene and acrylonitrile in a weight ratio of 95:5 to 50:50, in which connection styrene and/or acrylonitrile may be wholly or partially replaced by α-methylstyrene, methyl methacrylate or N-phenylmaleimide.

Particularly preferred are copolymers II) containing proportions of incorporated acrylonitrile units of ≦30 wt. %.

These copolymers preferably have mean molecular weights $\overline{M}_w$ of 20,000 to 200,000 and intrinsic viscosities [η] of 20 to 110 ml/g (measured in dimethylformamide at 25° C.).

Details regarding the production of these resins are described for example in DE-A 2 420 358 and DE-A 2 724 360. Vinyl resins produced by bulk polymerisation or solution polymerisation have proved to be particularly suitable. The copolymers may be added alone or as an arbitrary mixture.

Apart from using thermoplastic resins built up from vinyl monomers, it is also possible to use polycondensates, for example aromatic polycarbonates, aromatic polyester carbonates, polyesters or polyamides as rubber-free copolymer in the moulding compositions according to the invention.

Suitable thermoplastic polycarbonates and polyester carbonates are known (see for example DE-A 1 495 626, DE-A 2 232 877, DE-A 2 703 376, DE-A 2 714 544, DE-A 3 000 610, DE-A 3 832 396, DE-A 3 077 934), which may be prepared for example by reacting diphenols of the formulae (III) and (IV)

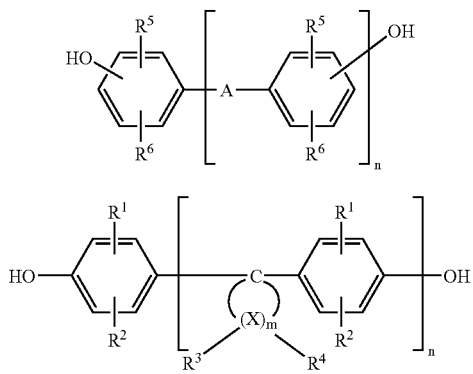

in which
A denotes a single bond $C_1$–$C_5$-alkylene, $C_2$–$C_5$-alkylidene, $C_5$–$C_6$-cycloalkylidene, —O—, —S—, —SO—, —SO$_2$— or —CO—,
$R^5$ and $R^6$ independently of one another denote hydrogen, methyl or halogen, in particular hydrogen, methyl, chlorine or bromine,
$R^1$ and $R^2$ independently of one another denote hydrogen, halogen, preferably chlorine or bromine, $C_1$–$C_8$-alkyl, preferably methyl, ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl —$C_1$–$C_4$-alkyl, in particular benzyl,
m is an integer from 4 to 7, preferably 4 or 5,
n is 0 or 1,
$R^3$ and $R^4$ may be selected individually for each X and independently of one another denote hydrogen or $C_1$–$C_6$-alkyl, and
X denotes carbon, with carbonic acid halides, preferably phosgene, and/or with aromatic dicarboxylic acid dihalides, preferably benzenedicarboxylic acid dihalides, by phase boundary polycondensation, or with phosgene by polycondensation in the homogeneous phase (so-called pyridine process), in which connection the molecular weight may be adjusted in a manner known per se by adding an appropriate amount of known chain terminators.

Suitable diphenols of the formulae (III) and (IV) are for example hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4,-trimethylcyclopentane.

Preferred diphenols of the formula (III) are 2,2-bis-(4-hyroxyphenyl)-propane and 1,1-bis-(4-hydroxyphenyl)-cyclohexane, and the preferred phenol of the formula (IV) is 1,1-bis-(4-hydroxyphenyl)-3,3,5-trimethylcyclohexane.

Mixtures of diphenols may also be used.

Suitable chain terminators are for example phenol, p-tert.-butylphenol, long-chain alkyl phenols such as 4-(1,3-tetramethylbutyl)phenol according to DE-A 2 842 005, monoalkylphenols, dialkylphenols having a total of 8 to 20 C atoms in the alkyl substituents according to DE-A 3 506 472, such as p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The necessary amount of chain terminators is generally 0.5 to 10 mole % referred to the sum of the diphenols (II) and (IV).

The suitable polycarbonates or polyester carbonates may be linear or branched; branched products are preferably obtained by incorporating 0.05 to 2.0 mole %, referred to the sum of the diphenols employed, of trifunctional or higher functionality compounds, for example those having three or more than three phenolic OH groups.

The suitable polycarbonates or polyester carbonates may contain aromatically bound halogen, preferably bromine and/or chlorine; however, they are preferably halogen-free.

The polycarbonates and polyester carbonates have mean molecular weights ($\overline{M}_w$, weight average), determined for example by ultracentrifugation or light scattering measurements, of 10,000 to 200,000, preferably 20,000 to 80,000.

Suitable thermoplastic polyesters are preferably polyalkylene terephthalates, i.e. reaction products of aromatic dicarboxylic acids or their reactive derivatives (e.g. dimethyl esters or anhydrides) with aliphatic, cycloaliphatic or arylaliphatic diols and mixtures of such reaction products.

Preferred polyalkylene terephthalates can be prepared from terephthalic acids (or their reactive derivatives) and aliphatic or cycloaliphatic diols with 2 to 10 C atoms according to known methods (Kunststoff-Handbuch, Vol. VIII, p. 695 ff, Carl Hanser Verlag, Munich 1973).

In preferred polyalkylene terephthalates 80 to 100 mole %, preferably 90 to 100 mole % of the dicarboxylic acid residues are terephthalic acid residues, and 80 to 100 mole %, preferably 90 to 100 mole % of the diol residues are ethylene glycol residues and/or butanediol-1,4 residues.

The preferred polyalkylene terephthalates may in addition to ethylene glycol residues or butanediol-1,4 residues also contain 0 to 20 mole % of residues of other aliphatic diols with 3 to 12 C atoms or cycloaliphatic diols with 6 to 12 C atoms, for example residues of propanediol-1,3, 2-ethylpropanediol-1,3, neopentyl glycol, pentanediol-1,5, hexanediol-1,6, cyclohexanedimethanol-1,4, 3-methylpentanediol-1,3 and -1,6, 2-ethylhexanediol-1,3, 2,2-diethylpropanediol-1,3, hexanediol-2,5, 1,4-di(β-hydroxyethoxy)-benzene, 2,2-bis-4-(hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates may be branched by incorporating relatively small amounts of trihydroxy or tetrahydroxy alcohols or 3-basic or 4-basic carboxylic acids, such as as are described in DE-OS 1 900 270 and in U.S. Pat. No. 3,692,744. Examples of preferred branching agents are trimesic acid, trimellitic acid, trimethylolethane and trimethylolpropane, and pentacrythritol. It is advisable to use not more than 1 mole % of the branching agent, referred to the active component.

Particularly preferred are polyalkylene terephthalates that have been produced solely from terephthalic acid and its reactive derivatives (for example its dialkyl esters) and ethylene glycol and/or butanediol-1,4, and mixtures of these polyalkylene terephthalates.

Preferred polyalkylene terephthalates are also copolyesters that have been prepared from at least two of the abovementioned alcohol components: particularly preferred copolyesters are poly-(ethyleneglycolbutanediol-1,4)-terephthalates.

The preferably suitable polyalkylene terephthalates generally have an intrinsic viscosity of 0.4 to 1.5 dl/g, preferably 0.5 to 1.3 dl/g, in particular 0.6 to 1.2 dl/g, measured in each case in phenol/o-dichlorobenzene (1:1 parts by weight) at 25° C.

Suitable polyamides are known homopolyamides, copolyamides and mixtures of these polyamides. These polyamides may be partially crystalline and/or amorphous.

Suitable partially crystalline polyamides are polyamide-6, polyamide-6,6, mixtures and corresponding copolymers prepared from these components. Also suitable are partially crystalline polyamides whose acid component consists wholly or partially of terephthalic acid and/or isophthalic acid and/or cork acid and/or sebacic acid and/or azelaic acid and/or adipic acid and/or cyclohexanedicarboxylic acid, whose diamine component consists wholly or partially of m- and/or p-xylylene diamine and/or hexamethylene diamine and/or 2,2,4-trimethylhexamethylene diamine and/or 2,2,4-trimethylhexamethylene diamine and/or isophorone diamine, and whose composition is in principle known.

There may also be mentioned polyamides that have been produced wholly or partially from lactams with 7 to 12 C atoms in the ring, optionally with the co-use of one or more of the abovementioned starting components.

Particularly preferred partially crystalline polyamides are polyamide-6 and polyamide 6,6 and their mixtures. As amorphous polyamides there may be used known products that are obtained by polycondensation of diamines such as ethylene diamine, hexamethylene diamine, decamethylene diamine, 2,2,4- and/or 2,4,4-trimethylhexamethylene diamine, m- and/or p-xylylene diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5,-trimethylcyclohexylamine, 2,5- and/or 2,6-bis-(aminomethyl)-norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of several monomers, as well as copolymers prepared with the addition of aminocarboxylic acids such as $\epsilon$-aminocaproic acid, $\omega$-aminoundecanoic acid or $\omega$-aminolauric acid or their lactams.

Particularly suitable amorphous polyamides are the polyamides prepared from isophthalic acid, hexamethylene diamine and further diamines such as 4,4'-diaminodicyclohexylmethane, isophorone diamine, 2,2,4- and/or 2,4,4-trimethylhexamethylene diamine, 2,5- and/or 2,6-bis-(aminomethyl)-nobornene; or from isophthalic acid, 4,4'-diaminodicyclohexylmethane and $\epsilon$-caprolactam; or from isophthalic acid, 3,3'-dimethyl-4,4'-diaminodicyclohexylmethane and laurinlactam; or from terephthalic acid and the isomeric mixture of 2,2,4- and/or 2,4,4-trimethylhexamethylene diamine.

Instead of the pure 4,4'-diaminodicyclohexylmethane, mixtures of the positional isomeric diaminodicyclohexylmethanes consisting of the following components may also be used 70 to 99 mole % of the 4,4'-diamino isomer 1 to 30 mole % of the 2,4'-diamino isomer 0 to 2 mole % of the 2,2'-diamino isomer, and optionally correspondingly higher condensed diamines that are obtained by hydrogenating industrial quality diaminodiphenylmethane. The isophthalic acid may be replaced in an amount of up to 30% by terephthalic acid.

The polyamides preferably have a relative viscosity (measured in a 1 wt. % solution in m-cresol at 25° C.) of 2.0 to 5.0, particularly preferably 2.5 to 4.0.

Preferred moulding compositions according to the invention contain 1 to 60 parts by weight, preferably 5 to 50 parts by weight of graft polymer component I) and 40 to 99 parts by weight, preferably 50 to 95 parts by weight of rubber-free copolymer II).

The production of the moulding compositions according to the invention is carried out by mixing the components I) and II) in conventional mixing units (preferably in multiple roll mills, mixing extruders or internal kneaders).

The invention furthermore provides a process for producing the moulding compositions according to the invention, wherein the components I) and II) are mixed and are compounded and extruded at elevated temperature, in general at temperatures from 150° C. to 300° C.

Necessary and/or advantageous additives, for example antioxidants, UV stabilisers, peroxide destroyers, antistatic agents, lubricating agents, mould release agents, flame protection agents, fillers or reinforcing materials (glass fibres, carbon fibres etc.) and, pigments may be added to the moulding compositions according to the invention during the production, processing, further processing and final shaping stages.

The final shaping may be carried out in conventional processing units, and includes for example processing by injection moulding, sheet extrusion optionally followed by heat forming, cold forming, extrusion of pipes and profiled sections, and calender processing.

In the following examples the specified parts are always parts by weight and the specified % are always wt. % unless otherwise stated.

EXAMPLES

Components

ABS Graft Polymer 1 (according to the invention)

15 parts by weight (calculated as solids) of an anionically emulsified polybutadiene latex with a mean particle diameter $d_{50}$ of 191 nm, a particle size distribution width $d_{90}-d_{10}$ of 42 nm and a gel content of 69 wt. % produced by free-radical seed polymerisation using a polybutadiene latex with a $d_{50}$ value of 46 nm, 30 parts by weight (calculated as solids) of an anionically emulsified polybutadiene latex with a mean particle diameter $d_{50}$ of 297 nm, a particle size distribution width $d_{90}-d_{10}$ of 77 nm and a gel content of 61 wt. % produced by free-radical seed polymerisation using a polybutadiene latex with a $d_{50}$ value of 125 nm as seed latex, and 15 parts by weight (calculated as solids) of an anionically emulsified polybutadiene latex with a mean particle diameter $d_{50}$ of 422 nm, a particle size distribution width $d_{90}-d_{10}$ of 63 nm and a gel content of 80 wt. % produced by free-radical seed polymerisation using a polybutadiene latex with a $d_{50}$ value of 125 nm as seed latex are adjusted with water to a solids content of ca. 20 wt. %, heated to 59° C., following which 0.5 part by weight of potassium peroxodisulfate (dissolved in water) is added.

40 parts by weight of a mixture of 73 wt. % of styrene, 27 wt. % of acrylonitrile and 0.12 parts by weight of tert.-dodecyl mercaptan are uniformly metered in within 6 hours, and in parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 77° C. After a post-reaction time of 2 hours at 80° C. the graft latex is coagulated after adding ca. 1.0 part by weight of a phenolic antioxidant, with a magnesium sulfate/acetic acid mixture and, after washing with water, the resulting moist powder is dried at 70° C.

ABS Graft Polymer 2 (according to the invention)

15 parts by weight (calculated as solids) of an anionically emulsified polybutadiene latex with a mean particle diameter $d_{50}$ of 189 nm, a particle size distribution width $d_{90}$–$d_{10}$ of 50 nm and a gel content of 76 wt. % produced by free-radical seed polymerisation using a polybutadiene latex with a $d_{50}$ of 46 nm as seed latex, 30 parts by weight (calculated as solids) of an anionically emulsified polybutadiene latex with a mean particle diameter $d_{50}$ of 285 nm, a particle size distribution width $d_{90}$–$d_{10}$ of 60 nm and a gel content of 67 wt. % produced by free-radical seed polymerisation using a polybutadiene latex with a $d_{50}$ value of 119 nm as seed latex, and 15 parts by weight (calculated as solids) of an anionically emulsified polybutadiene latex with a mean particle diameter $d_{50}$ of 399 nm, a particle size distribution width $d_{90}$–$d_{10}$ of 56 nm and a gel content of 85 wt. % produced by free-radical seed polymerisation using a polybutadiene latex with a $d_{50}$ value of 189 nm as seed latex are adjusted with water to a solids content of ca. 20 wt. %, heated to 55° C., following which 0.5 part by weight of potassium peroxodisulfate (dissolved in water) is added.

40 parts by weight of a mixture of 73 wt. % of styrene, 27 wt. % of acrylonitrile and 0.12 part by weight of tert.-dodecyl mercaptan are uniformly metered in within 5 hours, and in parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 5 hours. During the course of the 5 hours the reaction temperature is raised from 55° C. to 80° C. After a post-reaction time of 2 hours at 80° C. the graft latex is coagulated after adding ca. 1.0 part by weight of a phenolic antioxidant, with a magnesium sulfate/acetic acid mixture, and after washing with water the resulting moist powder is dried at 70° C.

ABS Graft Polymer 3 (according to the invention)

15 parts by weight (calculated as solids) of an anionically emulsified polybutadiene latex with a mean particle diameter $d_{50}$ of 185 nm, a particle size distribution width $d_{90}$–$d_{10}$ of 51 nm and a gel content of 69 wt. % produced by free-radical seed polymerisation using a polybutadiene seed latex with a $d_{50}$ of 48 nm, 30 parts by weight (calculated as solids) of an anionically emulsified polybutadiene latex with a mean particle diameter $d_{50}$ of 297 nm, a particle size distribution width $d_{90}$–$d_{10}$ of 77 nm and a gel content of 61 wt. % produced by free-radical seed polymerisation using a polybutadiene latex with a $d_{50}$ value of 125 nm as seed latex, and 15 parts by weight (calculated as solids) of an anionically emulsified polybutadiene latex with a mean particle diameter $d_{50}$ of 422 nm, a particle size distribution width $d_{90}$–$d_{10}$ of 63 nm and a gel content of 80 wt. % produced by free-radical seed polymerisation using a polybutadiene seed latex with a $d_{50}$ value of 185 nm, are adjusted with water to a solids content of ca. 20 wt. %, heated to 55° C., following which 0.5 part by weight of potassium peroxodisulfate (dissolved in water) is added.

40 parts by weight of a mixture of 73 wt. % of styrene, 27 wt. % of acrylonitrile and 0.12 parts by weight of tert.-dodecyl mercaptan are uniformly metered in within 5 hours, and in parallel to this 1 part by weight (calculated as solids) of the sodium salt of a resin acid mixture (Dresinate 731, dissolved in alkaline adjusted water) is metered in over a period of 5 hours. During the course of the 5 hours the reaction temperature is raised from 55° C. to 80° C. After a post-reaction time of 2 hours at 80° C. the graft latex is coagulated after adding ca. 1.0 part by weight of a phenolic antioxidant, with a magnesium sulfate/acetic acid mixture, and after washing with water the resulting moist powder is dried at 70° C.

ABS Graft Polymer 4 (according to the invention)

20 parts by weight (calculated as solids) of an anionically emulsified polybutadiene latex with a mean particle diameter $d_{50}$ of 185 nm, a particle size distribution width $d_{90}$–$d_{10}$ of 51 nm and a gel content of 69 wt. % produced by free-radical seed polymerisation using a polybutadiene seed latex with a $d_{50}$ of 48 nm, 27.5 parts by weight (calculated as solids) of an anionically emulsified polybutadiene latex with a mean particle diameter $d_{50}$ of 297 nm, a particle size distribution width $d_{90}$–$d_{10}$ of 77 nm and a gel content of 61 wt. % produced by free-radical seed polymerisation using a polybutadiene latex with a $d_{50}$ value of 125 nm as seed latex, and 12.5 parts by weight (calculated as solids) of an anionically emulsified polybutadiene latex with a mean particle diameter $d_{50}$ of 422 nm, a particle size distribution width $d_{90}$–$d_{10}$ of 63 nm and a gel content of 80 wt. % produced by free-radical seed polymerisation using a polybutadiene latex with a $d_{50}$ value of 185 nm as seed latex, are adjusted with water to a solids content of ca. 20 wt. %, heated to 55° C., following which 0.5 part by weight of potassium peroxodisulfate (dissolved in water) is added.

40 parts by weight of a mixture of 73 wt. % of styrene, 27 wt. % of acrylonitrile and 0.12 parts by weight of tert.-dodecyl mercaptan are uniformly metered in within 5 hours, and in parallel to this 1 part by weight (calculated as solids) of the sodium salt of a resin acid mixture (Dresinate 731, dissolved in alkaline adjusted water) is metered in over a period of 5 hours. During the course of the 5 hours the reaction temperature is raised from 55° C. to 80° C. After a post-reaction time of 2 hours at 80° C. the graft latex is coagulated after adding ca. 1.0 part by weight of a phenolic antioxidant, with a magnesium sulfate/acetic acid mixture, and after washing with water the resulting moist powder is dried at 70° C.

ABS Graft Polymer 5 (according to the invention)

17.5 parts by weight (calculated as solids) of an anionically emulsified polybutadiene latex with a mean particle diameter $d_{50}$ of 189 nm, a particle size distribution width $d_{90}$–$d_{10}$ of 50 nm and a gel content of 76 wt. % produced by free-radical seed polymerisation using a polybutadiene seed latex with a $d_{50}$ of 46 nm, 35 parts by weight (calculated as solids) of an anionically emulsified polybutadiene latex with a mean particle diameter $d_{50}$ of 285 nm, a particle size distribution width $d_{90}$–$d_{10}$ of 60 nm and a gel content of 67 wt. % produced by free-radical seed polymerisation using a polybutadiene latex with a $d_{50}$ value of 119 nm as seed latex, and 17.5 parts by weight (calculated as solids) of an anionically emulsified polybutadiene latex with a mean particle diameter $d_{50}$ of 399 nm, a particle size distribution width $d_{90}$–$d_{10}$ of 56 nm and a gel content of 85 wt. % produced by free-radical seed polymerisation using a polybutadiene latex with a $d_{50}$ value of 189 nm as seed latex, are adjusted with water to a solids content of ca. 20 wt. %, heated to 55° C., following which 0.5 part by weight of potassium peroxodisulfate (dissolved in water) is added.

30 parts by weight of a mixture of 73 wt. % of styrene, 27 wt. % of acrylonitrile and 0.1 part by weight of tert.-dodecyl mercaptan are then uniformly added within 6 hours. The further production is carried out as described in ABS graft polymer 1.

ABS Graft Polymer 6 (according to the invention)

15 parts by weight (calculated as solids) of an anionically emulsified butadiene/styrene (90:10) copolymer latex with a mean particle diameter $d_{50}$ of 176 nm, a particle size distribution width $d_{90}$–$d_{10}$ of 48 nm and a gel content of 60 wt. %, produced by free-radical seed polymerisation using a butadiene/styrene (90:10) copolymer latex with a $d_{50}$ value of 39 nm as seed latex, 30 parts by weight (calculated as solids) of an anionically emulsified polybutadiene with a mean particle diameter $d_{50}$ of 285 nm, a particle size distribution width $d_{90}$–$d_{10}$ of 60 nm and a gel content of 67 wt. % produced by free-radical seed polymerisation using a polybutadiene latex with a $d_{50}$ value of 119 nm as seed latex, and 15 parts by weight (calculated as solids) of an anionically emulsified butadiene/styrene (90:10) copolymer latex with a mean particle diameter $d_{50}$ of 391 nm, a particle size distribution width $d_{90}$–$d_{10}$ of 75 nm and a gel content of 74 wt. % produced by free-radical seed polymerisation using a butadiene/styrene (90:10) copolymer latex with a $d_{50}$ value of 176 nm as seed latex, are adjusted with water to a solids content of ca. 20 wt. %, heated to 55° C., followed which 0.5 part by weight of potassium peroxodisulfate (dissolved in water) is added.

40 parts by weight of a mixture of 73 wt. % of styrene and 27 wt. % of acrylonitrile are then uniformly metered in within 5 hours, 0.12 part by weight of tert.-dodecyl mercaptan being uniformly metered in within the first 4 hours. In parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 5 hours. During the course of the 5 hours the reaction temperature is raised from 55° C. to 80° C. The further production is carried out as described in the ABS graft polymer 1.

ABS Graft Polymer 7 (comparison material, not according to the invention)

The production described under "ABS graft polymer 1" is repeated, wherein a polybutadiene latex with a mean particle diameter $d_{50}$ of 183 nm, a particle size distribution width $d_{90}$–$d_{10}$ of 103 nm and a gel content of 79 wt. %, produced without using seed latex was used as finely particulate rubber component, a polybutadiene latex with a mean particle diameter $d_{50}$ of 305 nm, a particle size distribution width $d_{90}$–$d_{10}$ of 108 nm and a gel content of 55 wt. % was used as mean particulate rubber component, and a polybutadiene latex with a mean particle diameter $d_{50}$ of 423 nm, a particle size distribution width $d_{90}$–$d_{10}$ of 99 nm and a gel content of 78 wt. % produced without using seed latex was used as coarsely particulate rubber component.

ABS graft polymer 8 (comparison material, not according to the invention)

The production described under "ABS graft polymer 1" is repeated, wherein instead of the polybutadiene latex mixture there were used 60 parts by weight (calculated as solids) of a polybutadiene latex with a mean particle diameter $d_{50}$ of 131 nm, a particle size distribution width $d_{90}$–$d_{10}$ of 76 nm and a gel content of 88 wt. % produced without using seed latex.

ABS graft polymer 9 (comparison material, not according to the invention)

The production described under "ABS graft polymer 1" is repeated, except that instead of the polybutadiene latex mixture there were used 60 parts by weight (calculated as solids) of a polybutadiene latex with a mean particle diameter $d_{50}$ of 423 nm, a particle size distribution width $d_{90}$–$d_{10}$ of 99 nm and a gel content of 78 wt. % produced without using seed latex.

Resin Component 1

Statistical styrene/acrylonitrile copolymer (styrene/acrylonitrile weight ratio 72:28) with a $\overline{M}_w$ of ca. 85,000 and $\overline{M}_w/\overline{M}_n - 1 \leq 2$ obtained by free-radical solution polymerisation.

Resin Component 2

Statistical styrene/acrylonitrile copolymer (styrene:acrylonitrile weight ratio 72:28) with a $\overline{M}_w$ of ca. 115,000 and $\overline{M}_w/\overline{M}_n 1 \leq 2$ obtained by free-radical solution polymerisation.

Moulding Compositions

The aforedescribed polymer components are mixed in the proportions given in Table 1 together with 2 parts by weight of ethylenediamine bisstearyl amide and 0.1 part by weight of a silicone oil in an internal kneader, and after granulation are processed into test pieces and into a flat sheet (in order to evaluate the surface).

The following data are obtained:

notched impact strength at room temperature ($a_k$) according to ISO 180/1A (unit: kJ/m$^2$), thermoplastic flowability (MVI) according to DIN 53735U (unit: cm$^3$/10 min) and surface gloss according to DIN 67530 at a reflecting angle of 20° (reflectometer value).

It is clear from the Examples (test data see Table 2) that the moulding compositions according to the invention are characterised by a combination of high toughness values, very good processability and extremely high gloss values.

TABLE 1

Compositions of the moulding compositions

| Example | ABS Graft Polymer 1 (parts by wt.) | ABS Graft Polymer 2 (parts by wt.) | ABS Graft Polymer 3 (parts by wt.) | ABS Graft Polymer 4 (parts by wt.) | ABS Graft Polymer 5 (parts by wt.) | ABS Graft Polymer 6 (parts by wt.) | ABS Graft Polymer 7 (parts by wt.) | ABS Graft Polymer 8 (parts by wt.) | ABS Graft Polymer 9 (parts by wt.) | Resin Component 1 (parts by wt.) | Resin Component 2 (parts by wt.) |
|---|---|---|---|---|---|---|---|---|---|---|---|
| 1 | 27 | — | — | — | — | — | — | — | — | 73 | — |
| 2 | — | 27 | — | — | — | — | — | — | — | 73 | — |
| 3 | — | — | 27 | — | — | — | — | — | — | 73 | — |
| 4 | — | — | — | 27 | — | — | — | — | — | 73 | — |
| 5 | — | — | — | — | 23.2 | — | — | — | — | 76.8 | — |
| 6 | — | — | — | — | — | 27 | — | — | — | 73 | — |
| 7(Comparison) | — | — | — | — | — | — | 27 | — | — | 73 | — |
| 8(Comparison) | — | — | — | — | — | — | — | 13.5 | 13.5 | 73 | — |
| 9 | 40 | — | — | — | — | — | — | — | — | — | 60 |

TABLE 1-continued

Compositions of the moulding compositions

| Example | ABS Graft Polymer 1 (parts by wt.) | ABS Graft Polymer 2 (parts by wt.) | ABS Graft Polymer 3 (parts by wt.) | ABS Graft Polymer 4 (parts by wt.) | ABS Graft Polymer 5 (parts by wt.) | ABS Graft Polymer 6 (parts by wt.) | ABS Graft Polymer 7 (parts by wt.) | ABS Graft Polymer 8 (parts by wt.) | ABS Graft Polymer 9 (parts by wt.) | Resin Component 1 (parts by wt.) | Resin Component 2 (parts by wt.) |
|---|---|---|---|---|---|---|---|---|---|---|---|
| 10 | — | — | 40 | — | — | — | — | — | — | — | 60 |
| 11 (Comparison) | — | — | — | — | — | — | — | — | 40 | — | 60 |

TABLE 2

Test data of the moulding compositions

| Example | $a_k$ (kJ/m$^2$) | MVI (cm$^3$/10 min) | Degree of Gloss |
|---|---|---|---|
| 1 | 18.1 | 39.9 | 98 |
| 2 | 19.2 | 39.0 | 96 |
| 3 | 19.4 | 39.1 | 96 |
| 4 | 17.1 | 40.2 | 96 |
| 5 | 19.4 | 38.3 | 95 |
| 6 | 18.6 | 40.1 | 96 |
| 7 (Comparison) | 19.1 | 36.2 | 92 |
| 8 (Comparison) | 18.3 | 35.2 | 93 |
| 9 | 32.0 | 8.1 | 95 |
| 10 | 30.8 | 8.5 | 95 |
| 11 (Comparison) | 30.3 | 7.6 | 88 |

The invention claimed is:

1. Polymer compositions containing
I) a graft rubber polymer that is obtained by emulsion polymerisation of styrene and acrylonitrile in a weight ratio of 95:5 to 50:50, wherein styrene and/or acrylonitrile can be wholly or partially replaced by α-methyistyrene, methyl methacrylate or N-phenylmaleimide or mixtures thereof, in the presence of a mixture of a butadiene polymer latex (A) with a mean particle diameter $d_{50} \leq 250$ nm and a particle size distribution width (measured as $d_{90}-d_{10}$ from the integral particle size distribution) of 20 to 80 nm and a gel content of 30 to 95 wt. %, a butadiene polymer latex (B) with a mean particle diameter $d_{50}>250$ to 350 nm, a particle size distribution width (measured as $d_{90}-d_{10}$ from the integral particle size distribution) of 30 to 100 nm and a gel content of 30 to 80 wt. %, and a butadiene polymer latex (C) with a mean particle diameter $d_{50}>350$ nm, a particle size distribution width (measured as $d_{90}-d_{10}$ from the integral particle size distribution) of 40 to 150 nm, and a gel content of 50 to 95 wt %, wherein the butadiene polymer latices in each case contain 0 to 50 wt. % of a further vinyl monomer incorporated by copolymerisation and wherein the mass ratio of the graft monomers that are used to the butadiene polymers that are used is 5:95 to 70:30, and
II) at least one rubber-free copolymer of styrene and acrylonitrile in a weight ratio of 95:5 to 50:50, wherein styrene and/or acrylonitrile can be wholly or partially replaced by α-methylstyrene, methyl methacrylate or N-phenylmaleimide or mixtures thereof,
wherein at least one latex selected from the butadiene polymer latices (A), (B) and (C) is produced by seed polymerisation.

2. Polymer compositions according to claim 1, wherein the butadiene polymer latex (A) has a mean particle diameter $d_{50}$ of 100 to 240 nm, a particle size distribution width (measured as $d_{90}>d_{10}$ from the integral particle size distribution) of 30 to 60 nm and a gel content of 40 to 90 wt. %, the butadiene polymer latex (B) has a mean particle diameter $d_{50}$ of 260 to 340 nm, a particle size distribution width (measured as $d_{90}-d_{10}$ from the integral particle size distribution) of 40 to 80 nm, and a gel content of 40 to 75 wt. %, and the butadiene polymer latex (C) has a mean particle diameter $d_{50}$ of 360 to 450 nm, a particle size distribution width (measured as $d_{90}-d_{10}$ from the integral particle size distribution) of 50 to 100 nm and a gel content of 55 to 90 wt. %.

3. Polymer compositions according to claim 1 wherein the butadiene polymer latex (A) has a mean particle diameter $d_{50}$ of 130 to 230 nm and a particle size distribution width (measured as $d_{90}-d_{10}$ from the integral particle size distribution) of 30 to 60 nm and a gel content of 50 to 85 wt. %, the butadiene polymer latex (B) has a mean particle diameter $d_{50}$ of 270 to 320 nm, a particle size distribution width (measured as $d_{90}-d_{10}$ from the integral particle size distribution) of 40 to 80 nm, and a gel content of 45 to 70 wt. %, and the butadiene polymer latex (C) has a mean particle diameter $d_{50}$ of 375 to 430 nm, a particle size distribution width (measured as $d_{90}-d_{10}$ from the integral particle size distribution) of 50 to 100 nm and a gel content of 60 to 85 wt %.

4. Polymer composition according to claim 1 wherein at least two latices selected from the butadiene polymer latices (A), (B) and (C), are produced by seed polymerisation.

5. Polymer composition according to claim 4, wherein all three butadiene polymer latices (A), (B) and (C), are produced by seed polymerisation.

6. Polymer compositions according to claim 1 containing in addition at least one resin selected from the group consisting of an aromatic polycarbonate, aromatic polyester carbonate, polyester and polyamide.

7. Polymer compositions according to claim 1 characterised in that in the production of the graft rubber polymers the monomers are added in such a way that 55 to 90 wt. % of all the monomers used in the graft polymerisation are metered in within the first half of the overall time for metering in the monomers, and the remaining proportion of the monomers is metered in within the second half of the overall time for metering in the monomers.

8. Polymer compositions according to claim 1 characterised in that in the production of the graft rubber polymers the temperature difference between the start and end of the grafting reaction is at least 15° C.

9. Process for producing polymer compositions according to claim 1 characterised in that the components I) and II) are mixed and are then compounded and extruded at elevated temperature.

10. A molded article comprising the polymer composition of claim 1.

11. Process for producing a polymer composition, wherein a graft rubber polymer that is obtained by emulsion polymerisation of styrene and acrylonitrile in a weight ratio of 95:5 to 50:50, wherein styrene and/or acrylonitrile can be wholly or partially replaced by a-methylstyrene, methyl methacrylate or N-phenylmaleimide or mixtures thereof, is produced in the presence of a mixture of a butadiene polymer latex (A) with a mean particle diameter $d_{50} \leq 250$ nm and a particle size distribution width (measured as $d_{90}$–$d_{10}$ from the integral particle size distribution) of 20 to 80 nm and a gel content of 30 to 95 wt. %, a butadiene polymer latex (B) with a mean particle diameter $d_{50} \leq 250$ to 350 nm, a particle size distribution width (measured as $d_{90}$–$d_{10}$ from the integral particle size distribution) of 30 to 100 nm, and a gel content of 30 to 80 wt. %, and a butadiene polymer latex (C) with a mean particle diameter $d_{50} > 350$ nm, a particle size distribution width (measured as $d_{90}$–$d_{10}$ from the integral particle size distribution) of 40 to 150 nm, and a gel content of 50 to 95 wt. %, using at least one latex produced by seed polymerisation and selected from the butadiene polymer latices (A),(B) and (C), wherein the butadiene polymer latices in each case contain 0 to 50 wt. % of a further vinyl monomer incomorated by copolymerisation and wherein the weight ratio of graft polymers that are used to the butadiene polymers that are used is 5:95 to 70:30, and the graft polymer is mixed with at least one rubber-free copolymer of styrene and acrylonitnie in a weight ratio of 95:5 to 50:50, wherein styrene and/or acrylonitrile may be partially or wholly replaced by alpha-styrene, methyl methacrylate or N-phenylmaleimide or mixtures thereof.

12. Graft rubber polymer that is obtained by emulsion polyrnerisation of styrene and acrylonttrile in a weight ratio of 95:5 to 50:50, wherein styrene and/or acrylonitrile can be wholly or partially replaced by α-methyistyrene, methyl methacrylate or N-phenylmaleimide or mixtures thereof, in the presence of a mixture of a butadiene polymer latex (A) with a mean particle diameter $d_{50} \leq 250$ nm and a particle size distribution width (measured as $d_{90}$–$d_{10}$ from the integral particle size distribution) of 20 to 80 nm, and a gel content of 30 to 95 wt. %, a butadiene polymer latex (B) with a mean particle diameter $d_{50} > 250$ to 350 nm, a particle size distribution width (measured as $d_{90}$–$d_{10}$ from the integral particle size distribution) of 30 to 100 nm, and a gel content of 30 to 80 wt. %, and a butadiene polymer latex (C) with a mean particle diameter $d_{50} > 350$ nm, a particle size distribution width (measured as $d_{90}$–$d_{10}$ from the integral particle size distribution) of 40 to 150 nm, and a gel content of 50 to 95 wt. %, wherein the butadiene polymer lafices in each case contain 0 to 50 wt. % of a further vinyl monomer incorporated by copolymerisation, wherein the weight ratio of the graft monomers that are used to the butadiene polymers latices that are used is 5:95 to 70:30, and wherein at least one latex selected from the butadiene polymer latices (A), (B) and (C) is produced by seed polymerisation.

* * * * *